No. 849,531. PATENTED APR. 9, 1907.
I. W. COLBURN & J. PLAYER.
DRAWING SHEET GLASS.
APPLICATION FILED MAY 18, 1906.
3 SHEETS—SHEET 1.
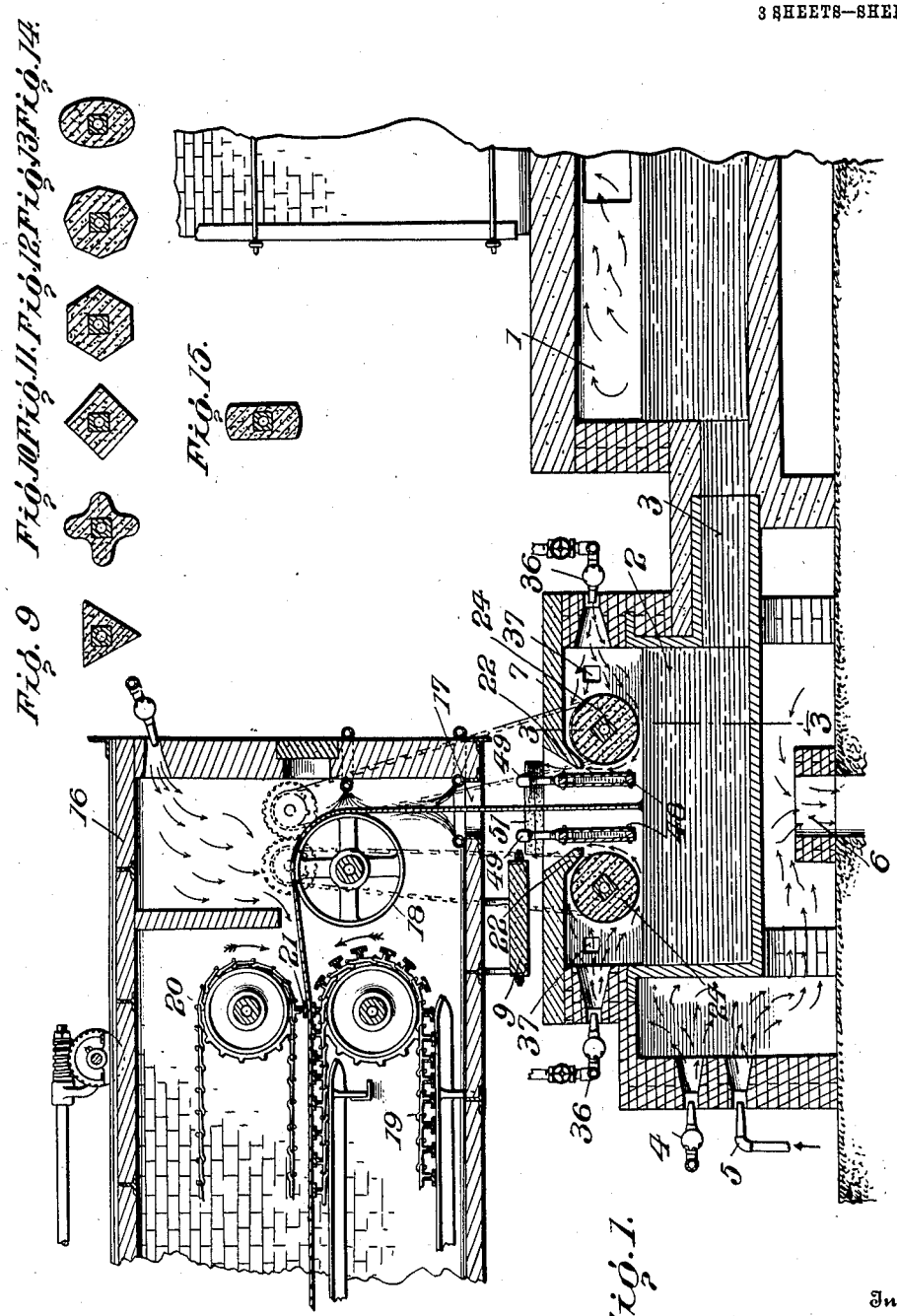
Witnesses
Ruth C. Fitzhugh.
Gustave R. Thompson.
Inventors
Irving W. Colburn
John Player
By Mauro, Cameron, Lewis & Massie
Attorneys

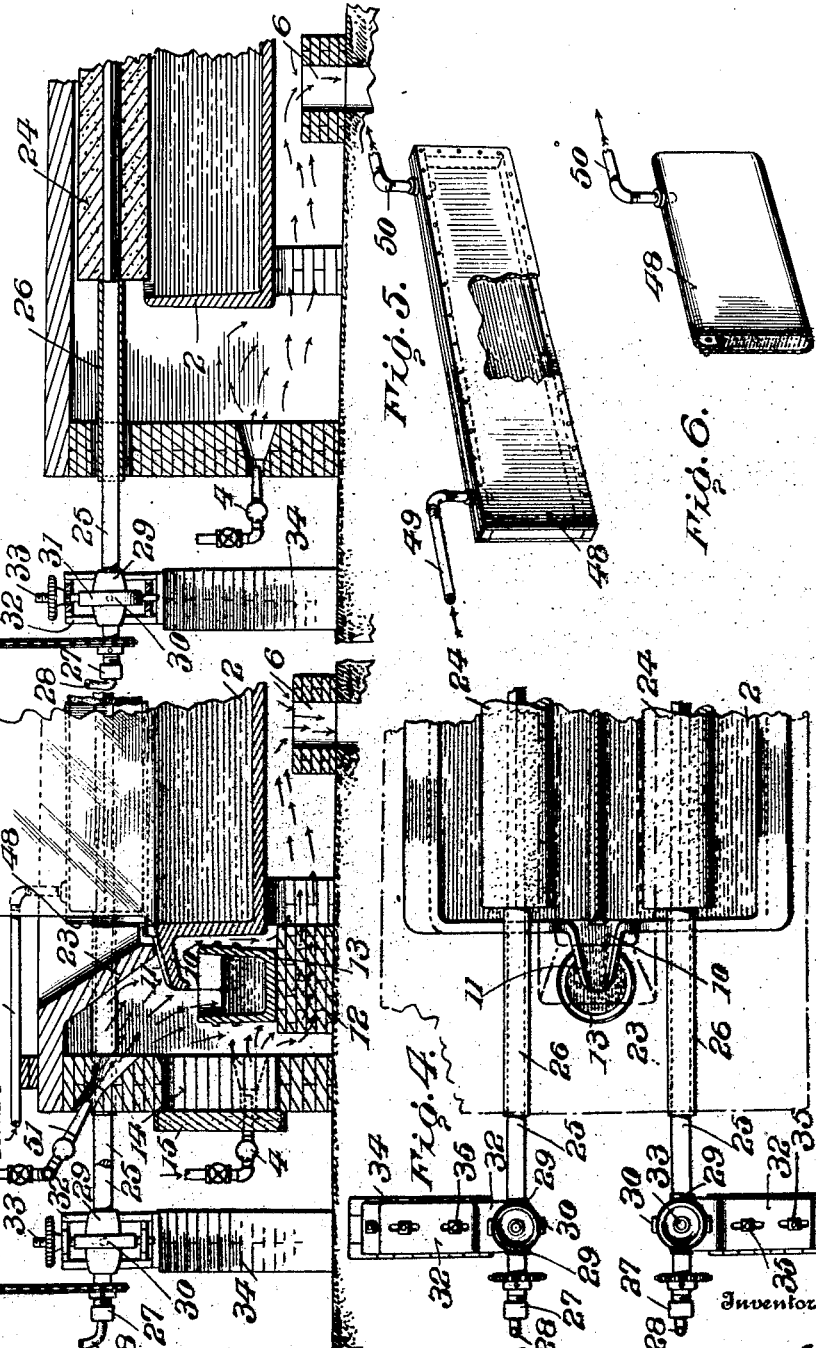

No. 849,531. PATENTED APR. 9, 1907.
I. W. COLBURN & J. PLAYER.
DRAWING SHEET GLASS.
APPLICATION FILED MAY 18, 1906.
3 SHEETS—SHEET 3.
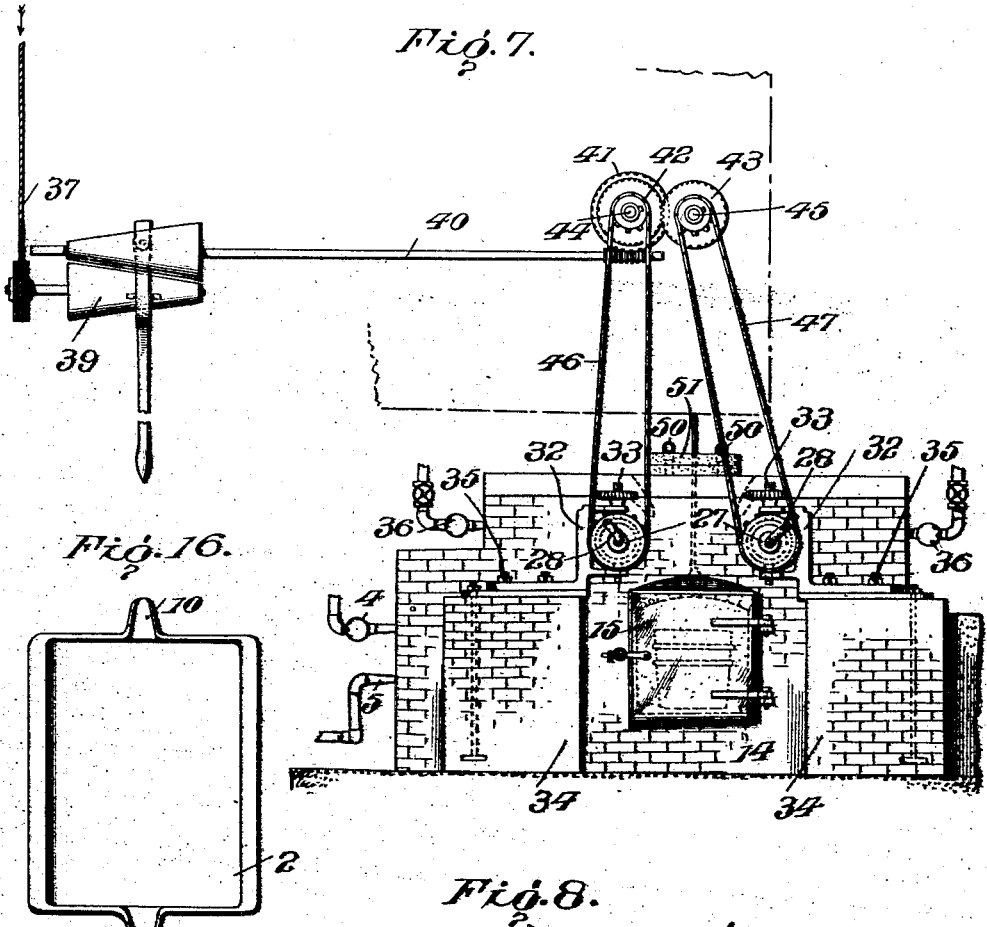
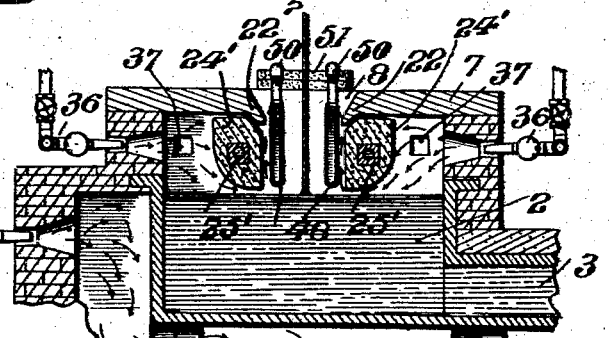

UNITED STATES PATENT OFFICE.

IRVING W. COLBURN, OF FRANKLIN, PENNSYLVANIA, AND JOHN PLAYER, OF RIVER FOREST, ILLINOIS, ASSIGNORS, BY DIRECT AND MESNE ASSIGNMENTS, TO COLBURN MACHINE GLASS COMPANY, OF FRANKLIN, PENNSYLVANIA, A CORPORATION OF NEW JERSEY.

DRAWING SHEET-GLASS.

No. 849,531.      Specification of Letters Patent.      Patented April 9, 1907.

Application filed May 18, 1906. Serial No. 317,584.

*To all whom it may concern:*

Be it known that we, IRVING W. COLBURN and JOHN PLAYER, of Franklin, Pennsylvania, and River Forest, Illinois, respectively, have invented a new and useful Improvement in Drawing Sheet-Glass, which improvement is fully set forth in the following specification.

This invention relates to the art of drawing glass, and more particularly to the art of drawing glass in sheet form.

It is well known in this art that when efforts are made to draw a sheet of glass from molten glass the tendency of the sheet is to rapidly draw to a thread or string, and that there is also a tendency to form wave-like lines or striæ on the surfaces of the drawn sheet, which largely detract from the commercial value of the glass.

In previous applications of I. W. Colburn and E. Washburn, Serial Nos. 238,592 and 248,288, filed, respectively, December 28, 1904, and March 3, 1905, there are disclosed methods and apparatus designed to overcome both the narrowing tendency of the sheet and also the formation of the wave-like lines or striæ in the surfaces of the sheet. In said application Serial No. 238,592 there is disclosed a process for drawing glass in sheet form and of uniform width which consists in drawing a sheet of glass from a mass of molten glass and simultaneously imparting movement to the surface of the molten mass away from the edges of the sheet being drawn, and thereby prevent the glass from narrowing during the drawing operation.

One part of the present invention constitutes a specific embodiment of the broad idea set forth in said application Serial No. 238,592, the movement of the surface of the molten mass away from the edges of the sheet being drawn being accomplished in the following manner: A mass of molten glass is contained in a working pot with its working level approximately constant, which level is below that of the retaining-wall of the pot, except at two opposite points in the walls, at each of which points there is an overflow-lip slightly below the normal working level of the molten glass, so that there is a constant flow of the surface portion of the molten glass over said lips, and the sheet of glass is drawn from the surface of the molten mass in the working chamber or pot with its plane on a line immediately between these two oppositely-disposed overflow-lips. The glass falling over the overflow-lips at points adjacent to the edges of the sheet imparts a movement to the surface of the molten mass away from the edges of the sheet as it is drawn, thus holding it to its full width.

In order to maintain the constant overflow, and hence the constant movement of the surface portion of the molten glass toward these overflow-lips, suitable means are employed for maintaining the working level of the molten glass in the working pot at a point just above the level of the overflow-lips. Any suitable means may be employed for this purpose. As herein shown, a melting-tank is in open communication with the working chamber or pot, into which tank raw materials are fed just fast enough to maintain the desired level in the working-pot.

The means herein shown and described for overcoming or avoiding the formation of wave-like lines or striæ in the sheet constitute a different means for accomplishing the same result as that set forth in said application Serial No. 248,288. In the present instance, for the purpose of avoiding the formation of these wave-like lines, we suspend in the working pot on opposite sides of the sheet of glass being drawn two bodies, preferably of refractory material, the same being placed a very slight distance above the surface of the molten glass in the pot, and we then create an intense heat to the rear of these bodies for the purpose of raising the temperature of the surface of the molten glass in the working pot to a point above that where wave-like lines will be formed. These bodies may, if desired, be stationary bodies and fixed in their positions. Preferably, however, they are mounted so as to be capable of being turned about horizontal axes, and preferably also they are mounted so that they may be adjusted to or from the sheet of glass being drawn and also may be raised or lowered, so as to vary the space between the lower line of said bodies and the surface of the molten glass in the working pot. It will be understood that these bodies are so adjusted with relation to the surface of the molten glass that a very thin film of intense heat is permitted to pass under them, and thereby melt down any wave-like lines that might have been formed on the surface of the molten glass, and also prevent the cooling of that portion of the surface of the molten mass that is just in the act of passing into the sheet being drawn, since such cooling (due to radiation from the exposed surface) is one fruitful cause of the appearance of the wave-like lines or striæ in the surfaces of the drawn sheet. As stated above, these bodies may be stationary; but preferably they are mounted so that they may be rotated on horizontal axes. This rotation may be an occasional turn by hand or otherwise; but by preference the bodies are slowly and constantly revolved. The particular cross-sectional form of these bodies may vary greatly. While we prefer a body in the form of a roller—that is, with a circular cross-section—they may be triangular, square, rectangular, oblong, or otherwise formed without departing from the spirit of the invention.

In order to enable the operator to control the thickness of the sheet of glass being formed and also to control and partially interrupt the film of heat which is permitted to pass under the bodies of refractory material, we preferably interpose suitable shields, one on each side of the sheet of glass being drawn and between the heat-deflecting bodies and said sheet. Such shields may be of any preferred or desired construction and are preferably formed so that they may be adjusted both in a vertical and a horizontal direction to regulate their proximity to the sheet of glass and also their proximity on the lower portions to the surface of the molten glass in the working pot. Preferably these shields are in the form of flat hollow bodies and are provided with means for maintaining a continuous circulation of a suitable cooling fluid, as water, therethrough, and a cooling medium is also preferably provided in connection with the guards or heat-deflecting bodies which perform the function of directing the film of heat along the surface of the molten glass.

The glass that is permitted to fall over the overflow-lips of the working chamber is preferably caught in pots of refractory material and removed from time to time as they become nearly filled, the molten glass therein being returned to the melting-furnace or dumped outside to form "cullet" to be used in making up new batches.

Any suitable means for drawing a sheet of glass from a mass of molten glass may be employed, and the operation may be that which results in the drawing of a single sheet at a time, or it may be a continuous operation, the latter being the form chosen for illustration in this application.

The invention consists of certain other minor details of procedure and construction which will be hereinafter more fully explained, and then pointed out in the claims.

The inventive idea involved, both in the method and apparatus, may receive a variety of expressions without in any way departing from the invention itself. In the accompanying drawings we have illustrated one form of apparatus which gives excellent results and which may be used to successfully practice the method of the invention; but it is to be understood that said drawings are merely for the purpose of illustrating the invention and are not to be taken as defining the limits of the invention, reference being had to the claims for that purpose.

In said drawings, Figure 1 is a broken vertical longitudinal section of so much of the apparatus as is necessary to illustrate the invention. Fig. 2 is a broken vertical section taken at right angles to Fig. 1, showing the shield in position and a sheet of glass in the act of being drawn. Fig. 3 is a broken vertical section on the line 3 3 of Fig. 1. Fig. 4 is a broken top plan view of Fig. 2. Fig. 5 is a broken perspective of one form of shield, while Fig. 6 is a perspective view of part of another form of shield. Fig. 7 is a side elevation looking from the left hand of Fig. 2. Fig. 8 is a cross-sectional view showing the stationary form of deflector or film-forming device. Figs. 9 to 15, inclusive, are end elevations of various forms of such guard or heat-deflectors or film-forming devices. Fig. 16 is a plan, on a reduced scale, of the working pot.

Referring to the drawings, in which like reference-numerals indicate corresponding parts, 1 is a melting-furnace to which heat is supplied in any suitable manner and into which material for forming a "batch" is supplied from time to time.

2 is a working pot, and 3 is an open conduit between the melting-furnace and the working pot, whereby the glass is permitted to rise in the working pot to the same height as it is in the melting-furnace. The working pot is provided with suitable means, as burners 4 and 5, for developing the heat necessary to maintain the glass in proper working condition, and 6 is a downwardly-leading flue conducting off the products of combustion. The working chamber or pot is provided with a cover 7, which entirely closes its top, except for an oblong slot 8 of some considerable width, which is opened during the operation of drawing the sheet of glass, but which is closed by a cover 9 when the apparatus is not in operation. This working chamber or pot is provided at each end thereof with an overflow-lip 10, which lip is somewhat below the level of the top of the walls of the working pot and preferably is extended, so as to form a delivery-spout 11.

Immediately under the spout 11, on a pier 12, is a receiving-pot 13, into which the molten glass which overflows through the lip 10 is received. This pot is inserted and removed through an opening 14 in the walls of the apparatus, which opening 14 is normally closed by a door 15, of refractory material. This pot 13 may be handled in any suitable manner, as by tongs or other suitable carriers, either arranged for hand manipulation or in connection with a trolley. Since the particular method of handling this pot 13 does not form any essential part of the invention, such means are not herein illustrated.

Immediately over the slot 8 and the cover 7 of the working pot is a drawing-chamber 16, having an open slot 17 in the lower wall, and within said chamber is a revolving drum 18, while to the rear of this drum is a carrier-table 19 and a sprocket-chain 20, having grip-bars 21, which operate in conjunction with the carrier-table to grip and supply the drawing force to the sheet of glass, as fully illustrated and described in my previous applications above mentioned. Inasmuch as the specific construction of this drawing apparatus forms no part of the present invention, it will not be necessary to further illustrate or describe the same.

The cover 7 is provided along the sides of the slot 8 with downwardly-projecting lips 22, which are designed to prevent the escape of heat from the working pot. These lips 22 only extend down a short distance on the sides of the slot 8; but there is formed on the ends of the slot downwardly-extending lips 23, Fig. 2, which come down immediately over the end walls of the working pot and close to the overflow-lips 10.

Extending transversely across the working chamber or pot and to the rear of the protecting-lips 22 22 of the slot-opening are a pair of guards or heat-deflector bodies 24. These bodies are mounted so as to lie with their lower surfaces a slight distance above the level of the molten glass in the working pot. They may be fixed in position. Preferably, however, they are so mounted that they may be adjusted either toward or from each other in a horizontal plane and also toward and from the surface of the molten glass in a vertical direction. In addition to being mounted so as to be capable of the two adjustments mentioned we also prefer to have the bodies mounted so that they may be rotated around their axes, the rotation being either an intermittent one or (preferably) a continuous rotation. When the bodies are to be rotated, they are each preferably mounted upon a hollow shaft 25, which is provided with a protecting-bushing 26, surrounding the shaft or at least that portion of the shaft lying within the furnace for the working pot between the ends of the refractory body and the exterior portion of the furnace. Said shaft is preferably square or is otherwise provided with means for keying it to the refractory material, so that the said refractory body will rotate therewith, and means, as a packing-box 27 and inlet-pipe 28, are provided for directing a cooling fluid, such as water, through the hollow shaft. Preferably these shafts (one for each guard or deflector) are mounted in bearings 29, supported by horizontal trunnions 30 in a ring 31, which ring is itself mounted in frame 32 to turn around a vertical axis 33, which axis is vertically adjustable by reason of a screw-thread and nut, as will be readily understood from inspection of Figs. 2 and 3. Each end of the supporting-shafts is mounted in the same kind of bearings. It will be understood that each of the shafts is mounted in the same way and that the frames 32 32 at each end are horizontally adjustable toward and from each other, being secured to suitable piers 34, Figs. 4 and 7, by bolts 35, which may be loosened to permit the horizontal adjustment.

To the rear of each of the guards or deflecting-bodies 24 are provided means for directing the hot blast upon the rear surface of of said bodies, which means, as here shown, consist of burners 36, projecting in through the walls of the working chamber and direct their jet of flame directly against the rear of the guards or deflecting-bodies, flues 37 being provided for carrying off the products of combustion and a thin film of intensely-heated gases passing over the surface of the molten glass in the working pot immediately under the guards or deflecting-bodies, thereby acting to prevent the formation of wave-lines or striæ in the sheet of glass as it is drawn. For the purpose of preventing the destructive action of the gases upon the guards or heat-deflectors 24 said deflectors are preferably glazed, this being readily accomplished by lowering the guards or deflectors until they come in contact with the molten glass in the working chamber and then slowly revolve the same until a film of molten glass is formed upon the exterior of the guards or deflectors, after which they may be raised above the molten glass into the position shown in the drawings. When said guards or deflector-bodies are to be rotated, any suitable means for applying power thereto may be provided. Such means are illustrated in Fig. 7, in which 38 is a power-belt for driving one member of a cone-pulley, through which power is applied to a worm-shaft 40, gearing with a worm-wheel 41, which in turn drives a gear 42, gearing with a second gear 43, whereby the shafts 44 and 45 are revolved in opposite directions. Over these shafts are passed sprocket-chains 46 and 47, which pass over sprocket-wheels upon the ends of the shafts 26 of the guards or deflectors, and thereby revolve the same.

The heat-film passing under the guards or deflector-bodies 24, together with the heat radiated from said bodies, would be liable to melt down the glass passing into the sheet being drawn, and thereby cause the sheet of glass to be too thin. For the purpose of controlling this heat-film and preventing this effect of the radiated heat from said bodies there is suspended on opposite sides of the sheet of glass being drawn and between said sheet and said guards or deflector-bodies shields 48. (Best shown in Fig. 5.) These shields may be in any suitable form and of any suitable material. As here shown, they are in the form of hollow bodies preferably composed of boiler-iron and are provided with means for circulating a cooling medium, as water, therethrough, such means consisting of an inlet-pipe 49 and an outlet-pipe 50. These hollow shields may be constructed either of boiler-plates suitably riveted, as shown in Fig. 5, or they may be constructed of a single piece of bent boiler-iron, as shown in Fig. 6. These shields are suspended on either side of the sheet of glass by means of inlet and outlet pipes 49 and 50 and are preferably arranged to be adjusted both in a vertical and a horizontal direction, to the end that they may be caused to approach nearer to or farther from the sheet of glass and also to the end that they may be raised or lowered with relation to the surface of the molten glass, thereby varying the amount of heat passing under them from the heat-film that escapes under the guards or deflectors 24. Any suitable means for securing the adjustments mentioned may be employed. Very simple and effective means consist in merely placing bricks 51, of refractory material under the projecting ends of the inlet and outlet pipes 49 and 50, or any other suitable means may be employed, if desired. It will be observed that these shields 48 coöperate with the guards or deflectors 24, so as to effectually control the heat-film passing under said guards or deflectors and at the same time protect the portion of the sheet which has been drawn from the deteriorating effect of the heat radiated by the guards or deflectors, and that therefore the two bodies—that is, the guards or deflectors and the shields—coöperate in a peculiar manner to the successful control of the heat-film, whose function is to annihilate or prevent the formation of the wave-lines or striæ in the sheet.

As shown in Fig. 8, the guards or deflector-bodies 24' are incapable of revolution and are merely hung on transverse shafts which enable them to be adjusted either vertically or horizontally, or both, as may be desired.

The glass which escapes from the working chamber or pot by way of the overflow-lips 10 is kept in a molten condition, so that it will flow readily by means of heat supplied thereto from a burner 52, so positioned as to direct a jet of flame and gases of combustion directly down upon the glass as it flows from said lip and its attached spout 11. Were not this heat thus supplied to the overflow glass the glass would be liable to cool and clog the discharge-opening, and thereby prevent the lateral movement of the surface portion of the molten glass which is necessary to maintain the sheet of glass of uniform width.

In practicing the method of our invention by the use of the apparatus described the cover 9 is removed from the slot in the top of the working chamber, and the shields 48 are hung in place and the inlet and outlet pipes suitably connected to a source of water-supply and to the sewer. The guards or deflectors 24 are then adjusted to the desired height above the surface of the molten mass, so as to permit a very thin film of the heated gases of combustion to pass thereunder, and, if desired, the guards are set in rotation. The sheet of glass is then started up between the two shields 44 by any suitable means, as by inserting an ordinary bait in the mass of molten glass and lifting it slowly upward over the drum 18 and between the carrier 19 and the grip-bars 21, when the said carrier and grip-bars being set in operation they act to seize the sheet of glass and continuously advance it through the apparatus. The mass of molten glass in the furnace 1 is maintained at the proper height by supplying raw materials or "batch" in sufficient quantities to compensate for the glass that goes into the drawn sheet and also that which overflows at the overflow-lips 10. The action of the molten mass flowing slowly toward the overflow-lips serves to effectually counteract the narrowing tendency of the sheet during the drawing operation, while the film of heated gases of combustion which passes under the guards or deflectors 24 serves to annihilate or prevent the formation of the wave-like lines or striæ. The effective action of these films of heated gases is controlled by means of the shields 48. A portion of the said film of heated gases rises to the rear of the shields, while another portion advances in a horizontal direction and passes under the shields. This portion must not be large enough to produce such an effect as to melt down the glass advancing into the sheet being drawn, and the amount that is thus permitted to pass under the shields is regulated by means of the vertical adjustment of the shields. During this operation the guards or deflectors 24 may be continuously rotated by throwing the cone-pulley 39 into operation, or in case this is not applied thereto they may be occasionally turned by hand, or, on the other hand, they may remain stationary during the operation, as will be the case in the construction shown in Fig. 8.

When the apparatus is employed and the method practiced as hereinbefore described, there will be produced a beautiful sheet of glass of uniform width and thickness entirely free from wave-like lines or striæ. It will be understood, of course, that the thickness of the sheet of glass may be varied by the degree of temperature of the molten mass of glass, by the manipulation of the heat film which passes under the guards or deflectors, and by the rapidity with which the sheet is drawn.

What is claimed is—

1. The method of drawing sheet-glass which consists in preparing a mass of molten glass, causing the surface portion of said mass to overflow its container at two opposite points, and drawing a sheet of glass from said molten mass between said points.

2. The method of drawing sheet-glass which consists in preparing a mass of molten glass, causing the surface portion of said mass to overflow its container at two opposite points, drawing a sheet of glass from said molten mass between said points, and maintaining the level of the molten mass approximately constant during the drawing operation.

3. The method of drawing sheet-glass which consists in preparing a mass of molten glass, causing the surface portion of the molten mass to flow by gravity in opposite directions, and drawing a sheet of glass from said molten mass with its plane in the line of flow of the glass.

4. The method of drawing sheet-glass which consists in preparing a mass of molten glass, causing the surface portion of the molten mass to flow by gravity in opposite directions, drawing a sheet of glass from said molten mass with its plane in the line of flow of the glass, and maintaining the level of the molten mass approximately constant during the drawing operation.

5. The method of drawing sheet-glass which consists in preparing a mass of molten glass, causing the surface portion of said mass to overflow its container at two opposite points, drawing a sheet of glass from said mass with its plane in a line between said points, and directing a film of heated gases over the surface of the molten mass on opposite sides of the sheet during the drawing operation, whereby a sheet is obtained of uniform width and without wave-lines in its surface.

6. The method of drawing sheet-glass which consists in preparing a mass of molten glass, drawing a sheet of glass of uniform width therefrom, and directing a film of heated gases over the surface of the molten mass on opposite sides of the sheet during the drawing operation, the temperature of said gases being above that at which wave-lines or striæ are formed on the surface of the molten mass.

7. In apparatus for drawing sheet-glass, the combination of a receptacle containing molten glass and having oppositely-disposed outlets for the surface portion of said molten glass, means maintaining the level of the molten glass high enough to flow from said outlets, and means drawing a sheet of glass from said molten mass with its plane in a line between said outlets.

8. In apparatus for drawing sheet-glass, the combination of a receptacle containing molten glass and having oppositely-disposed outlets for the surface portion of said glass, means maintaining the level of the molten glass high enough to flow from said outlets, and means drawing a sheet of glass from the molten glass in said receptacle with the plane of said sheet in a line between said outlets.

9. In apparatus for drawing sheet-glass, the combination of a receptacle containing a mass of molten glass, means for drawing a sheet of glass of uniform width therefrom, means directing highly-heated gases into said receptacle on each side of said sheet and above the molten mass, and rotatable guards or deflectors mounted in said receptacle one on each side of said sheet with their lower lines slightly above the surface of said molten mass, whereby a thin film of said heated gases is permitted to pass along the surface of the molten mass and under said guards or deflectors.

10. In apparatus for drawing sheet-glass, the combination of a receptacle containing a mass of molten glass, means for drawing a sheet of glass of uniform width therefrom, means directing highly-heated gases into said receptacle on each side of said sheet and above the molten mass, and continuously-rotating guards or deflectors mounted in said receptacle one on each side of said sheet with their lower lines slightly above the surface of said molten mass, whereby a thin film of said heated gases is permitted to pass along the surface of the molten mass and under said guards or deflectors.

11. In apparatus for drawing sheet-glass, the combination of a receptacle containing a mass of molten glass, means drawing a sheet of glass of uniform width therefrom, means directing highly-heated gases into said receptacle on each side of said sheet and above said molten mass, a guard or deflector on each side of said sheet and positioned to permit but a thin film of said gases to pass between the same and the surface of said molten mass, and two shields one between each guard and said sheet of glass.

12. In apparatus for drawing sheet-glass, the combination of a receptacle containing a mass of molten glass, means drawing a sheet of glass of uniform width therefrom, means directing highly-heated gases into said receptacle on each side of said sheet and above said molten mass, a guard or deflector on each side of said sheet and positioned to permit but a thin film of said gases to pass between the same and the surface of said molten mass, and two shields one between each guard and said sheet of glass, each of said shields being mounted with its lower edge slightly above the surface of said molten mass.

13. In apparatus for drawing sheet-glass, the combination of a receptacle containing a mass of molten glass, means drawing a sheet of glass of uniform width therefrom, means directing highly-heated gases into said receptacle on each side of said sheet and above said molten mass, a guard or deflector on each side of said sheet and positioned to permit but a thin film of said gases to pass between the same and the surface of said molten mass, and two horizontally-adjustable shields one between each guard and said sheet of glass.

14. In apparatus for drawing sheet-glass, the combination of a receptacle containing a mass of molten glass, means drawing a sheet of glass of uniform width therefrom, means directing highly-heated gases into said receptacle on each side of said sheet and above said molten mass, a guard or deflector on each side of said sheet and positioned to permit but a thin film of said gases to pass between the same and the surface of said molten mass, and two vertically-adjustable shields one between each guard and said sheet of glass.

15. In apparatus for drawing sheet-glass, the combination of a receptacle containing a mass of molten glass, means drawing a sheet of glass of uniform width therefrom, means directing highly-heated gases into said receptacle above said molten mass, two guards or deflectors mounted in said receptacle one on each side of said sheet and above the surface of said molten mass, and means for horizontally adjusting said guards or deflectors.

16. In apparatus for drawing sheet-glass, the combination of a receptacle containing a mass of molten glass, means drawing a sheet of glass of uniform width therefrom, means directing highly-heated gases into said receptacle above said molten mass, two guards or deflectors mounted in said receptacle one on each side of said sheet and above the surface of said molten mass, and means for vertically adjusting said guards or deflectors.

17. In apparatus for drawing sheet-glass, the combination of a receptacle containing a mass of molten glass, means drawing a sheet of glass of uniform width therefrom, means directing highly-heated gases into said receptacle above said mass, two guards or deflectors one on either side of said sheet, two shields mounted in said receptacle one between each guard or deflector and the sheet of glass, and means directing a cooling medium through said shields.

18. In apparatus for drawing sheet-glass, the combination of a receptacle containing a mass of molten glass, means drawing a sheet of glass of uniform width therefrom, means directing highly-heated gases into said receptacle above said mass, two guards or deflectors one on either side of said sheet, two shields mounted in said receptacle one between each guard or deflector and the sheet of glass, means whereby said guards and said shields may be horizontally and vertically adjusted, and means directing a cooling medium through said shields.

19. In apparatus for drawing sheet-glass, the combination of a receptacle for molten glass with two oppositely-disposed discharge places formed in its walls, means maintaining molten glass in said receptacle high enough to flow from said discharge places, whereby the surface portion of the molten glass is caused to flow in opposite directions, means drawing a sheet of glass from the molten glass in said receptacle with its plane in the line of flow of the glass toward said discharge places, and means supplying heat to the glass flowing from said discharge places, whereby the clogging of the discharged glass is avoided.

20. In apparatus for drawing sheet-glass, the combination of a receptacle containing a mass of molten glass and having oppositely-disposed overflow-lips in its walls at a level below the top of said walls, spouts extending outward from said lips, means directing highly-heated gases against said spouts, means maintaining the molten glass in said receptacle above the level of said lips, and means for drawing a sheet of glass from said molten mass, the plane of said sheet lying in a line extending between said lips.

In testimony whereof we have signed this specification in the presence of two subscribing witnesses.

IRVING W. COLBURN.
JOHN PLAYER.

Witnesses to signature of Irving W. Colburn:
ROBERT N. SPEER,
F. B. BLACK.

Witnesses to signature of John Player:
WILLIAM A. ADAMS,
WILLIAM C. MOATS.